United States Patent [19]
Almgren et al.

[11] Patent Number: 5,828,948
[45] Date of Patent: Oct. 27, 1998

[54] DYNAMIC ALLOCATION OF CHANNELS IN A CELLULAR TELEPHONE SYSTEM

[75] Inventors: Knut Magnus Almgren, Sollentuna; Yngve Kenneth Wallstedt, Solna, both of Sweden

[73] Assignee: Telefonaktiebolaget LM Ericsson, Stockholm, Sweden

[21] Appl. No.: 418,684

[22] Filed: Apr. 7, 1995

[51] Int. Cl.⁶ .................................................. H04Q 7/00
[52] U.S. Cl. ...................... 455/34.1; 455/34.2; 455/541; 455/62
[58] Field of Search .................. 455/34.2, 34.1, 455/54.1, 62, 33.1, 67.1, 63; 379/59

[56] References Cited

U.S. PATENT DOCUMENTS

| | | | |
|---|---|---|---|
| 4,144,411 | 3/1979 | Frenkiel | 179/2 |
| 4,485,486 | 11/1984 | Webb et al. | 455/33 |
| 4,670,906 | 6/1987 | Thro | 455/56 |
| 4,750,198 | 6/1988 | Harper | 379/59 |
| 4,866,710 | 9/1989 | Schaeffer | 370/95.1 |
| 5,038,399 | 8/1991 | Bruckert | 455/33 |
| 5,056,109 | 10/1991 | Gilhousen et al. | 375/1 |
| 5,109,528 | 4/1992 | Uddenfeldt | 455/33.2 |
| 5,123,110 | 6/1992 | Grube | 455/33.1 |
| 5,157,709 | 10/1992 | Ohteru | 379/58 |
| 5,175,867 | 12/1992 | Wejke et al. | 455/33.1 |

(List continued on next page.)

FOREIGN PATENT DOCUMENTS

| | | |
|---|---|---|
| 411 878 | 2/1991 | European Pat. Off. . |
| 0 431 956 | 6/1991 | European Pat. Off. . |
| 458 158 | 11/1991 | European Pat. Off. . |
| 0 513 841 | 11/1992 | European Pat. Off. . |
| 578 197 | 1/1994 | European Pat. Off. . |
| 0 585 994 | 3/1994 | European Pat. Off. . |
| 4-124920 (A) | 4/1992 | Japan . |
| 2 266 433 | 10/1993 | United Kingdom . |
| WO93/08655 | 4/1993 | WIPO . |

OTHER PUBLICATIONS

G. Falciasecca et al., "Investigation on a Dynamic Channel Allocation for High Capacity Mobile Radio Systems", *38th Vehicular Technology Conference*, pp. 176–181, Jun. 1988.

Kevin A. West et al., "An Aggressive Dynamic Channel Assignment Strategy for a Microcellular Environment", *8105 IEEE Transacations on Vehicular Technology*, vol. 43 (1994) Nov., No. 4, New York, US, pp. 1027–1038.

(List continued on next page.)

*Primary Examiner*—Reinhard J. Eisenzopf
*Assistant Examiner*—Darnell R. Armstrong
*Attorney, Agent, or Firm*—Burns, Doane, Swecker & Mathis, L.L.P.

[57] ABSTRACT

A cellular communication system has a plurality of cells and a plurality of channels. The plurality of channels includes a plurality of measurable channels for which interference can be measured in both uplink and downlink directions and a plurality of unmeasured channels for which interference are not made in both uplink and downlink directions. The measurable channels, designated probe channels, may be channels for use in a digital system. The unmeasured channels may be channels for use in an analog system, or broadcast channels. A method and apparatus for allocating the plurality of channels comprises initially organizing the plurality of channels into a plurality of channel groups, wherein each channel group includes at least one probe channel, and wherein at least one of the channel groups further includes at least one unmeasured channel. Then, each one of the cells performs an allocation routine comprising the steps of monitoring at least one of the channel groups by making and collecting uplink and downlink interference measurements only on the probe channel of each monitored channel group over a predetermined time period. Then, the collected uplink and downlink interference measurements are analyzed in accordance with an adaptive channel allocation strategy. Finally, a selected one of the monitored channel groups is allocated to the cell in dependence on the analyzed uplink and downlink interference measurements. In this manner, the unmeasured channels are also subjected to an adaptive channel allocation strategy.

18 Claims, 7 Drawing Sheets

U.S. PATENT DOCUMENTS

| | | | |
|---|---|---|---|
| 5,185,739 | 2/1993 | Spear | 370/95.3 |
| 5,203,012 | 4/1993 | Patsiokas et al. | 455/34.1 |
| 5,218,630 | 6/1993 | Patsiokas et al. | 379/59 |
| 5,230,082 | 7/1993 | Ghisler et al. | 455/33.2 |
| 5,239,676 | 8/1993 | Strawsczynski et al. | 455/33.2 |
| 5,247,699 | 9/1993 | Hartman | 455/33.1 |
| 5,257,398 | 10/1993 | Schaeffer | 455/33.1 |
| 5,276,908 | 1/1994 | Koohgoli et al. | 455/34.1 |
| 5,309,503 | 5/1994 | Bruckert et al. | 379/60 |
| 5,363,428 | 11/1994 | Nagashima | 379/58 |
| 5,369,783 | 11/1994 | Childress et al. | 455/17 |
| 5,375,123 | 12/1994 | Andersson et al. | 370/95.1 |
| 5,594,949 | 1/1997 | Andersson et al. | 455/62 |

OTHER PUBLICATIONS

Samuel W. Halpern, "Reuse partitioning in Cellular Systems", *33rd IEEE Vehicular Technology Conference*, pp. 322–327, May 25–27, 1983, Toronto, Ontario, Canada.

PCT International Search Report, Date of Mailing: 18 Jul. 1995.

Conference Proceedings, *"Performance of Dynamic Channel Assignment Techniques in a Cellular Environment"*, 25 Jun. 1992—26 Jun. 1992, pp. 340–343.

M. Almgren et al., "Capacity Enhancements in a TDMA System", *VTC '93*, 1993.

H. Andersson et al., "Adaptive Channel Allocation in TIA IS–54 System," *42nd IEEE Veh. Tech. Conf.*, pp. 778–781, Denver, 1992.

R. Beck & H. Panzer, "Strategies for Handover and Dynamic Channel Allocation in Micro–Cellular Mobile Radio Systems," *39th IEEE Vehicular Technology Conf.*, pp. 178–185, 1989.

R.C. Bernhardt, "Call Performance in a Frequency Reuse Digital Portable Radio System," *IEEE Transactions on Vehicular Technology*, pp. 777–785, vol. 40, No. 4, Nov. 1991.

R.C. Bernhart, "Time–Slot Management in Frequency Reuse Digital Portable Radio Systems," *Proc. of Veh. Tech. Conf.*, 282–286, 1990.

J. C.–I. Chuang, "Autonomous Adaptive Frequency Assignment for TDMA Portable Radio Systems," *IEEE Transactions on Vehicular Technology*, pp. 627–635, vol. 40, No. 3, Aug. 1991.

J. C.–I Chuang, "Autonomous Frequency Assignment and Access for TDMA Personal Portable Radio Communications," *41st IEEE Vehicular Technology Conf.*, pp. 699–703, St. Louis, May 1991.

J.C.–I, Chuang, "Performance Issues and Algorithms for Dynamic Channel Assignment," *Proc. IEEE Globecom '92*, pp. 1419–1424, Orlando, 1992.

D.C. Cox & D.O. Reudink, "Increasing Channel Occupancy in Large–Scale Mobile Radio Systems: Dynamic Channel Reassignment," *IEEE Transactions on Communications*, pp. 1302–1306, vol. COM–21, No. 11, Nov. 1973.

M. Doque–Antón et al., "Channel Assignment for Cellular Radio Using Simulated Annealing," *IEEE Transactions on Vehicular Technology*, pp. 14–21, vol. 42, No. 1, Feb. 1993.

H. Eriksson, "Capacity Improvement by Adaptive Channel Allocation," *IEEE Global Telecom. Conference*, pp. 1355–1359, Nov. 28–Dec. 1, 1988.

H. Eriksson & R. Bownds, "Performance of Dynamic Channel Allocation in the DECT System," *41st IEEE Vehicular Technology Conf.* pp. 693–698, St. Louis, May 1991.

D. Everitt & D. Manfield, "Performance Analysis of Cellular Mobile Communication Systems with Dynamic Channel Assignment," *IEEE Journal on Selected Areas in Communications*, pp. 1172–1180, vol. 7, No. 8, Oct. 1989.

G. Falciasecca et al., "On the Impact of Traffic Burst on Performances of High Capacity Cellular Systems," *Proc. of Veh. Tech. Conf.*, p. 646–651, 1990.

M. Frodigh, "Reuse–Partitioning Combined with Traffic Adaptive Channel Assignment for Highway Microcellular Radio Systems," *Proc. IEEE Globecom'92*,pp. 1414–1418, Atlanta, 1992.

Y. Furuya & Y. Akaiwa, "Channel Segregation, A Distributed Adaptive Channel Allocation Scheme for Mobile Communication Systems," *Second Nordic Seminar on Digital Land Mobile Radio Communications*, pp. 311–315, Stockholm, Oct. 14–16, 1986.

A. Gamst, "Some Lower Bounds for a Class of Frequency Assignment Problems," *IEEE Transactions on Vehicular Technology*, pp. 8–14, vol. VT–35, No. 1, Feb. 1986.

T. Kanai, "Autonomous Reuse Partitioning in Cellular Systems," *42nd IEEE Veh. Tech. Conf.*, 782–785, Denver 1992.

D. Kunz, "Practical Channel Assignment Using Neural Networks," *VTC '90*, pp. 652–655, 1990.

R.W. Nettleton & G.R. Schloemer, "A High Capacity Assignment Method for Cellular Mobile Telephone Systems," *Proc. of Veh. Tech. Conf.*, pp. 359–367, San Francisco, May 1–3, 1989.

R.W. Nettleton, "Traffic Statistics in a Self–Organizing Cellular Telephone Systems," *Proc. of Veh. Tech. Conf.*, pp. 305–310, 1990.

S.–H. Oh & D.–W. Tcha, "Prioritized Channel Assignment in a Cellular Radio Network," *IEEE Transactions on Communications*, pp. 1259–1269, vol. 40, No. 7, Jul. 1992.

S. Onoe & Yasuda, "Flexible Re–use for Dynamic Channel Assignment in Mobile Radio Systems," *Proc. IEEE IC'89*, pp. 472–476, Jun. 1989.

H. Panzer & R. Beck, "Adaptive Resource Allocation in Metropolitan Area Cellular Mobile Radio Systems," *Proc. of Veh. Tech. Conf.*, pp. 638–645, 1990.

G. Riva, "Performance Analysis of an Improved Dynamic Channel Allocation Scheme for Cellular Mobile Radio Systems," *42nd IEEE Veh. Tech. Conf.*, pp. 794–797, Denver, 1992.

A.N. Rosenberg, "Simulation of Power Control and Voice–Channel Selection in Cellular Systems," *Proc.IEEE VTC'85*, pp. 12–15, 1985.

K. Sallberg et al., "Hybrid Channel Assignment and Reuse Partitioning in a Cellular Mobile Telephone System," *Proc. IEEE VTC '87*, pp. 405–411, 1987.

L.P. Shu & J.W. Chen, "Dynamic Grouping Algorithm for Cellular Communications Systems," *Proc. of Veh. Tech. Conf.*, pp. 689–692, 1991.

K.N. Sivarajan et al., "Channel Assignment in Cellular Radio," *Proc. of Veh. Tech. Conf. 1989*, pp. 846–850, 1989.

K.N. Sivarajan et al., "Dynamic Channel Assignment in Cellular Radio," *Proc. of Veh. Tech. Conf.*, pp. 631–637, 1990.

J. Tajima, "A Strategy for Flexible Channel Assignment in Mobile Communication Systems," *IEEE Transactions on Vehicular Technology*, pp. 92–103, vol. 37, No. 2, May 1988.

R.A. Valenzuela, "Dynamic Resource Allocation in Line-of-Sight Microcells," *IEEE Proc. GLOBECOM'92*, pp. 1425–1430, Orlando, 1992.

S. Yasuda & S. Onoe, "Autonomous Channel Assignment Control for Flexible Reuse in Mobile Radio Systems," *Proc. of 42nd Veh. Tech. Conf.*, pp. 798–801, Denver, May 10–13, 1992.

J. Zander & M. Frodigh, "Capacity Allocation and Channel Assignment in Cellular Radio Systems Using Reuse Partitioning," *Electronics Letters*, pp. 438–440, vol. 28, No. 5, Feb. 27, 1992.

J. Zander, "Distributed Cochannel Interference Control in Cellular Radio Systems," *IEEE Transactions on Vehicular Technology*, pp. 305–311, 1992.

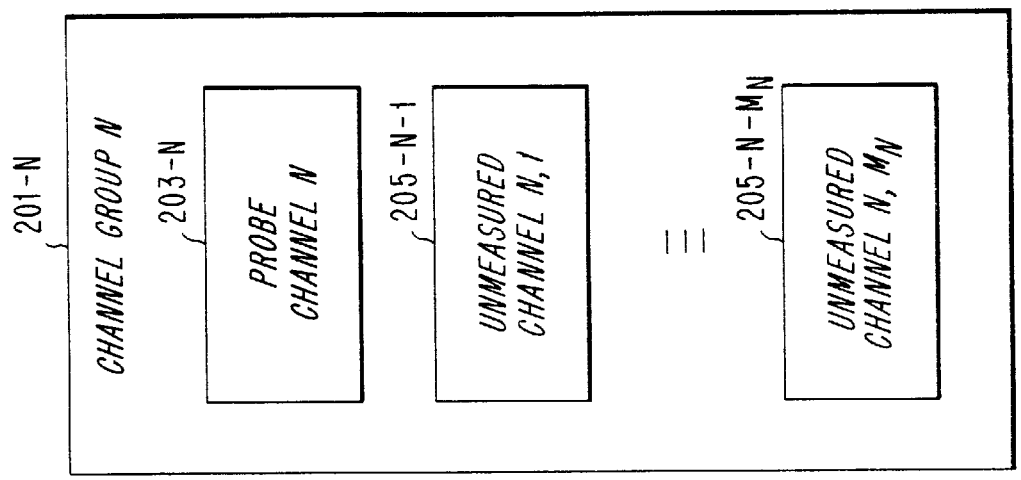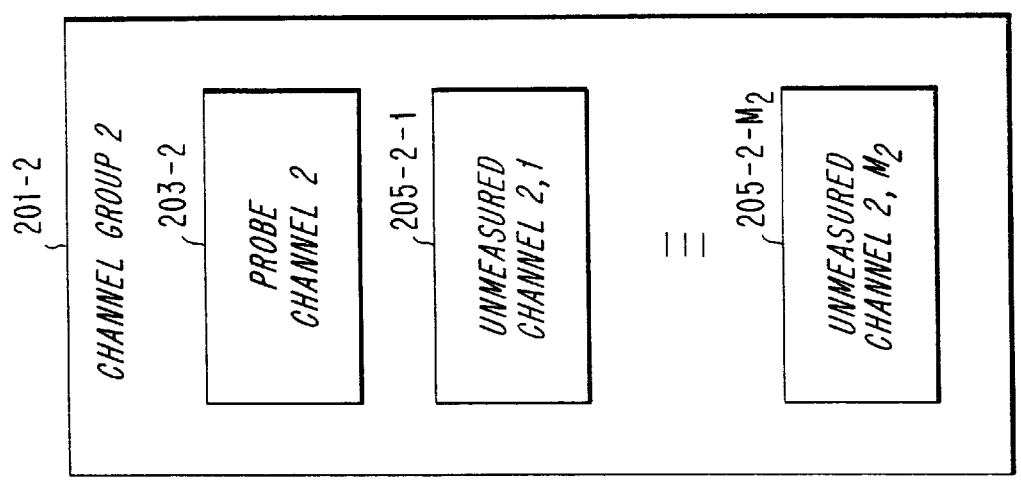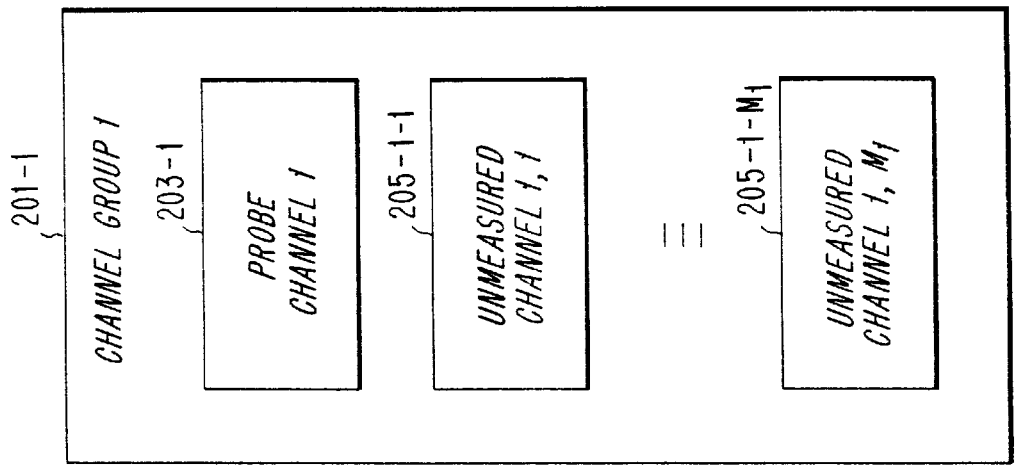
Fig. 2

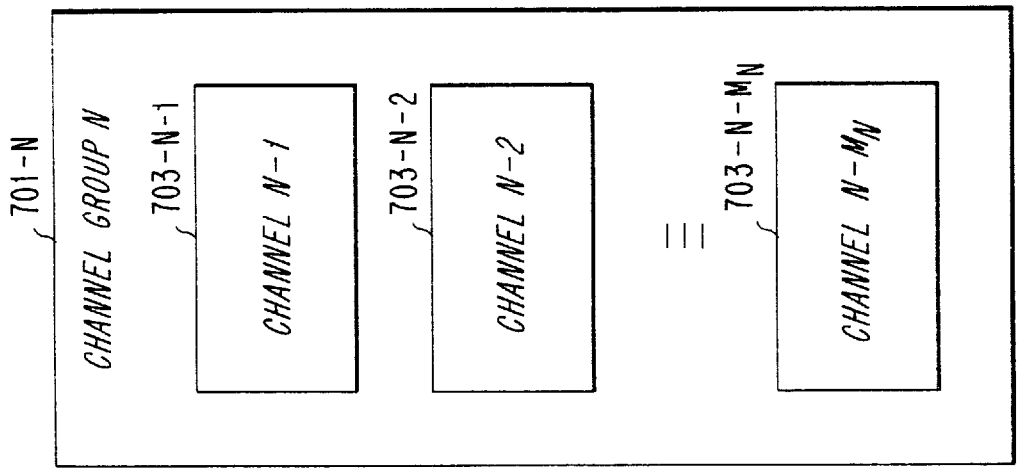
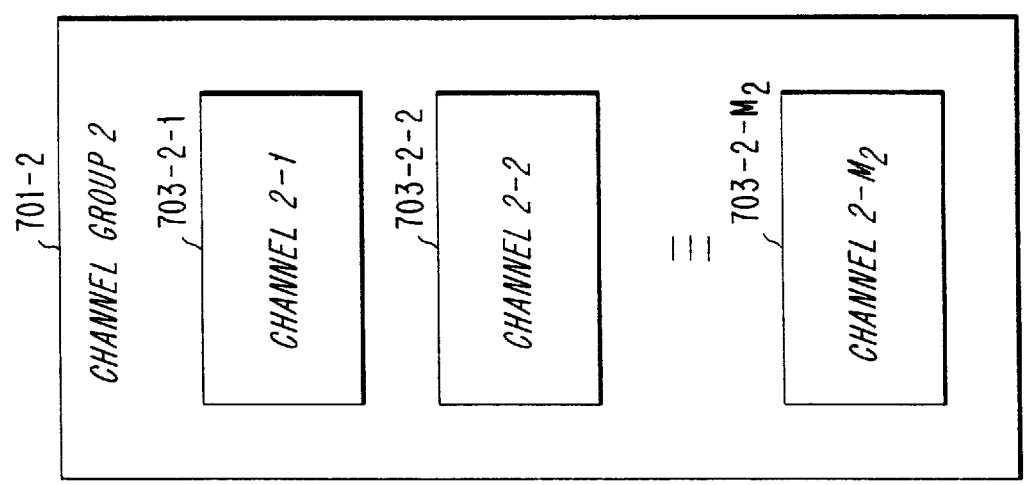
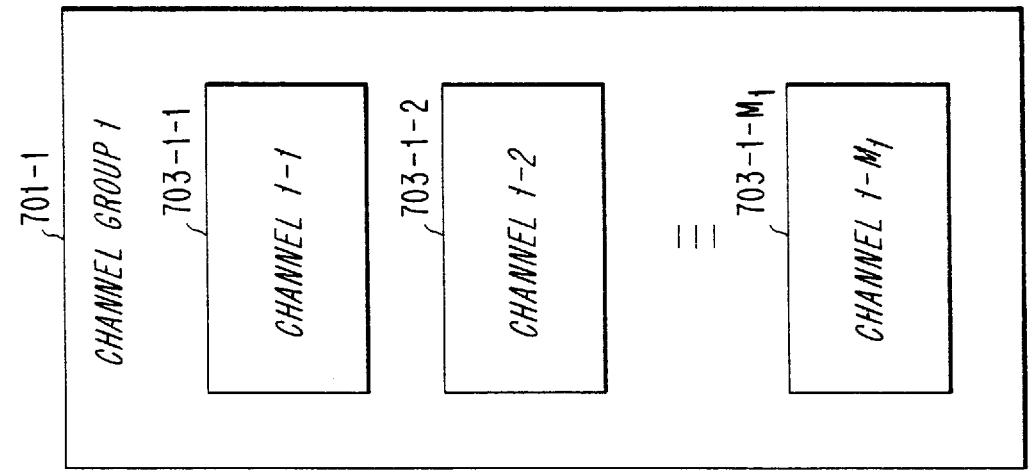
Fig. 7

DYNAMIC ALLOCATION OF CHANNELS IN A CELLULAR TELEPHONE SYSTEM

BACKGROUND

The present invention relates to cellular telephone systems, and more particularly to the allocation of channels to cells in a cellular telephone system.

In cellular telephone communications systems (henceforth referred to as "cellular systems", or simply "systems"), it is important to maximize traffic-handling capacity. One factor that affects capacity is the way the totality of available communication channels are allocated for use by particular cells within the system. The use of the same channel by two or more cells that are in relatively close proximity to one another can cause each cell to experience excessive co-channel interference, and should therefore be avoided.

One solution for avoiding excessive co-channel interference is to have each cell operate on a dedicated group of channels that are not used by any other cell in the system. Although this strategy successfully avoids the occurrence of co-channel interference, it limits the system's traffic-handling capacity to the number of channels that the system is permitted to use.

In order to increase the system's traffic-handling capacity, it is possible to devise a reuse plan whereby any one channel may be concurrently used by two or more cells. While some co-channel interference may occur, excessive interference is avoided by ensuring that the one channel is allocated to cells that are geographically located far enough apart (referred to as the "reuse distance") so as not to significantly interfere with one another. The appropriate distance for avoiding significant interference will depend on factors such as the power level at which each of the base stations or mobiles broadcasts on that particular channel.

A number of techniques have been devised for selecting and assigning traffic channels in a way that reduces the likelihood of co-channel interference in a cellular communication system using a fixed channel reuse plan, that is, a plan that does not change over time. U.S. patent application No. 08/114,347, filed by R. Bodin et al. and entitled "Channel Selection In a Cellular Communications System", describes such a plan. Essentially, such techniques require that an a priory channel plan be devised by the cellular system operator, and then "hard-wired" into the system. The channel plan designates, for each cell, a particular subset of channels to be used within that cell.

Fixed channel reuse plans are based upon assumptions about anticipated traffic in each cell. However, the number of calls that are handled by any given cell may increase or decrease over time. Consequently, cellular systems that utilize fixed channel reuse plans may suffer a degradation in traffic-handling capacity as a result of their inflexibility in the face of changing conditions.

To avoid such degradation, an adaptive channel allocation (ACA) plan may be used instead of the fixed channel reuse plan. In an ACA plan, as the name implies, the allocation of channels to cells adapts over time in order to accommodate changes in system use that occur over time. The adaptation is made on the basis of system measurements that are at least periodically made. The goal, in such a scheme, is to allocate channels so that all links have satisfactory quality. A common feature of ACA systems is that they allocate a channel out of a set of channels which fulfills some predetermined quality criteria. However, different ACA schemes utilize different criteria for selecting channels from the set.

The general concept underlying ACA systems is well-known to those having ordinary skill in the art. For example, H. Eriksson, "Capacity Improvement by Adaptive Channel Allocation", *IEEE Global Telecomm. conf.*, pp. 1355–1359, Nov. 28–Dec. 1, 1988, illustrates the capacity gains associated with a cellular radio system where all of the channels are a common resource shared by all base stations. In the above-referenced report, the mobile measures the signal quality of the downlink, and channels are assigned on the basis of selecting the channel with the highest carrier to interference ratio (C/I level).

A different approach is described by G. Riva, "Performance Analysis of an Improved Dynamic Channel Allocation Scheme for Cellular Mobile Radio Systems", 42nd *IEEE Veh. Tech. Conf.*, pp. 794–797, Denver, 1992, where the channel is selected based on achieving a quality close to or slightly better than a required C/I threshold. Also, Y. Furuya et al., "Channel Segregation, A Distributed Adaptive Channel Allocation Scheme for Mobile Communications Systems", *Second Nordic Seminar on Digital Land Mobile Radio Communication*, pp. 311–315, Stockholm, Oct. 14–16, 1986, describes an ACA system wherein the recent history of link quality is considered as a factor in allocation decisions. In addition, several hybrid systems have been presented where ACA is applied to a small block of frequencies on top of a fixed channel allocation scheme. Such an example is presented in K. Sallberg et al., "Hybrid Channel Assignment and Reuse Partitioning in a Cellular Mobile Telephone System", *Proc. IEEE VTC '87*, pp. 405–411, 1987.

Apart from increases in system capacity, adaptive channel allocation obviates the need for system planning. Planning is instead performed by the system itself. This feature of ACA is particularly attractive when system changes are implemented, when new base stations are added, or when the environment changes, for example by the construction or demolition of large buildings.

It is preferable to implement ACA schemes in two parts: a "slow" part, and a "fast" part. The "slow" part determines, for each cell, a set of channels to be used based on interference and traffic fluctuations that occur over a relatively long period of time (e.g., over a period of time that may span hours or even days). The "fast" part is concerned with selecting at any given moment, from the slowly determined set of channels, the "best" channel for each connection. One reason for splitting an ACA scheme into two parts (i.e., "fast" and "slow") is because of the use of combiners that are mechanically tuned, by means of small motors, to desired frequency ranges. Tuning is an automatic, but slow, operation that cannot be performed when a call arrives at the cell.

For a conventional ACA plan to work at its best, it has been important for both downlink (i.e. from base station to mobile station) and uplink (i.e., from mobile station to base station) measurements of channel interference levels to be made on all channels.

Considering only digital cellular systems for the moment, ACA schemes have been feasible because there are some resources for making both uplink and downlink measurements. Uplink measurements may be made by equipment in the base station. Downlink measurements may be made by a mobile station, which then reports its measured values back to the base station. However, it is still difficult to obtain measurements on all channels. For example, in digital systems such as D-AMPS, the mobile assisted handover (MAHO) facility is used to evaluate the downlink disturbance levels on traffic frequencies that are currently not in use in the serving cell. This MAHO measurement resource is very limited, however, because each mobile can only measure a few frequencies. Downlink measurement resources are similarly scarce in the well-known GSM system. Therefore, it is desirable to provide a strategy for allocating channels that compensates for the various limitations of downlink measurement resources in some digital cellular systems.

Considering now the task of devising an ACA scheme for use in analog systems, one is faced with a difficult problem because analog systems typically do not have any provisions for making downlink measurements; they are confined to measuring channel interference in the uplink direction only. As a result, an ACA scheme that makes a channel allocation decision exclusively on the basis of that channel's uplink interference measurement may be ineffective at limiting co-channel interference. This has resulted in channel allocation for analog systems being manually planned in the prior art.

In addition to the problems discussed above, prior art ACA schemes have also been detrimentally affected by the difficulty in measuring uplink interference on broadcast channels due to the short access bursts.

SUMMARY

It is therefore an object of the present invention to provide an adaptive channel allocation strategy that may be applied to channels that cannot easily be measured in both the uplink and downlink directions.

It is another object of the present invention to provide an adaptive channel allocation strategy that improves the quality of allocation decisions even where channels may be measured in both the uplink and downlink directions.

In accordance with one aspect of the present invention, the foregoing and other objects are achieved in a cellular communication system comprising a plurality of cells and a plurality of channels. The plurality of channels comprises a plurality of probe channels for which interference can be measured in both uplink and downlink directions and a plurality of unmeasured channels for which interference measurements are not made in both uplink and downlink directions. The probe channels may be, for example, channels for use in a digital communication system. The unmeasured channels may be, for example, channels for which only uplink interference measurements can be made, such as traffic channels for use in an analog communication system such as AMPS. In accordance with one aspect of the invention, the plurality of channels are allocated by first organizing the plurality of channels into a plurality of channel groups, wherein each channel group comprises at least one probe channel, and wherein at least one of the channel groups further comprises at least one unmeasured channel.

Next, in each one of the cells, an allocation routine is performed, comprising the steps of monitoring at least one of the channel groups by making and collecting uplink and downlink interference measurements on the probe channel of said at least one of the channel groups over a predetermined time period. The collected uplink and downlink interference measurements are then analyzed, and a selected one of the monitored channel groups is allocated to the cell in dependence on the analyzed uplink and downlink interference measurements. For example, if a cell determines that there is very little detected interference on a probe channel over a predetermined period of time, then it may assume that the channel group to which the probe channel belongs is unassigned to any other nearby cells. Accordingly, the cell may allocate all of the channels in the channel group (including the unmeasured channels) to itself.

In accordance with one aspect of the invention, the entire channel allocation process may be decentralized by having each cell perform its own channel allocation routine.

In accordance with another aspect of the invention, determining that there is very little interference on a probe channel over a predetermined period of time may comprise generating a filtered measurement from the collected uplink and downlink probe channel interference measurements, and then comparing the filtered measurement with a predetermined value.

Alternatively, a number of channel groups might be monitored by the cell, and a filtered interference measurement determined for each. In this instance, determining that there is very little interference on a probe channel may include comparing the filtered interference measurements to one another.

In yet another aspect of the invention, all of the channels are measured channels. To be a measured channel in this aspect of the invention, it is not a requirement that both uplink and downlink measurements be made; the ability to make measurements in only one direction is sufficient, although making measurements in both uplink and downlink directions is permissible. In this aspect of the invention, the channels are organized into channel groups, and each channel in the group is monitored over time by the cells. Allocation decisions are made with respect to entire channel groups, not just individual channels. For example, the measurements for each channel group may be combined, and a decision to allocate a given channel group made on the basis of comparisons of the various combined measurements with one another. Because the total number of measurements per time unit on a channel group is much higher than the number of measurements per individual channel, better channel reallocation decisions can be made. Also, where the channels are, for example, all analog channels (which can only be measured in the uplink), using the combined measurement instead of individual measurements significantly increases the probability that a cell will be able to accurately detect whether any given channel group is already being used by a nearby cell, and should therefore be avoided.

BRIEF DESCRIPTION OF THE DRAWINGS

The objects and advantages of the invention will be understood by reading the following detailed description in conjunction with the drawings in which:

FIG. 2 is a diagram showing the organization of all of the channels in the cellular system in accordance with one embodiment of the invention;

FIG. 7. is a diagram showing the organization of all of the channels in the cellular system in accordance with an alternative embodiment of the invention.

DETAILED DESCRIPTION

Figure 1:
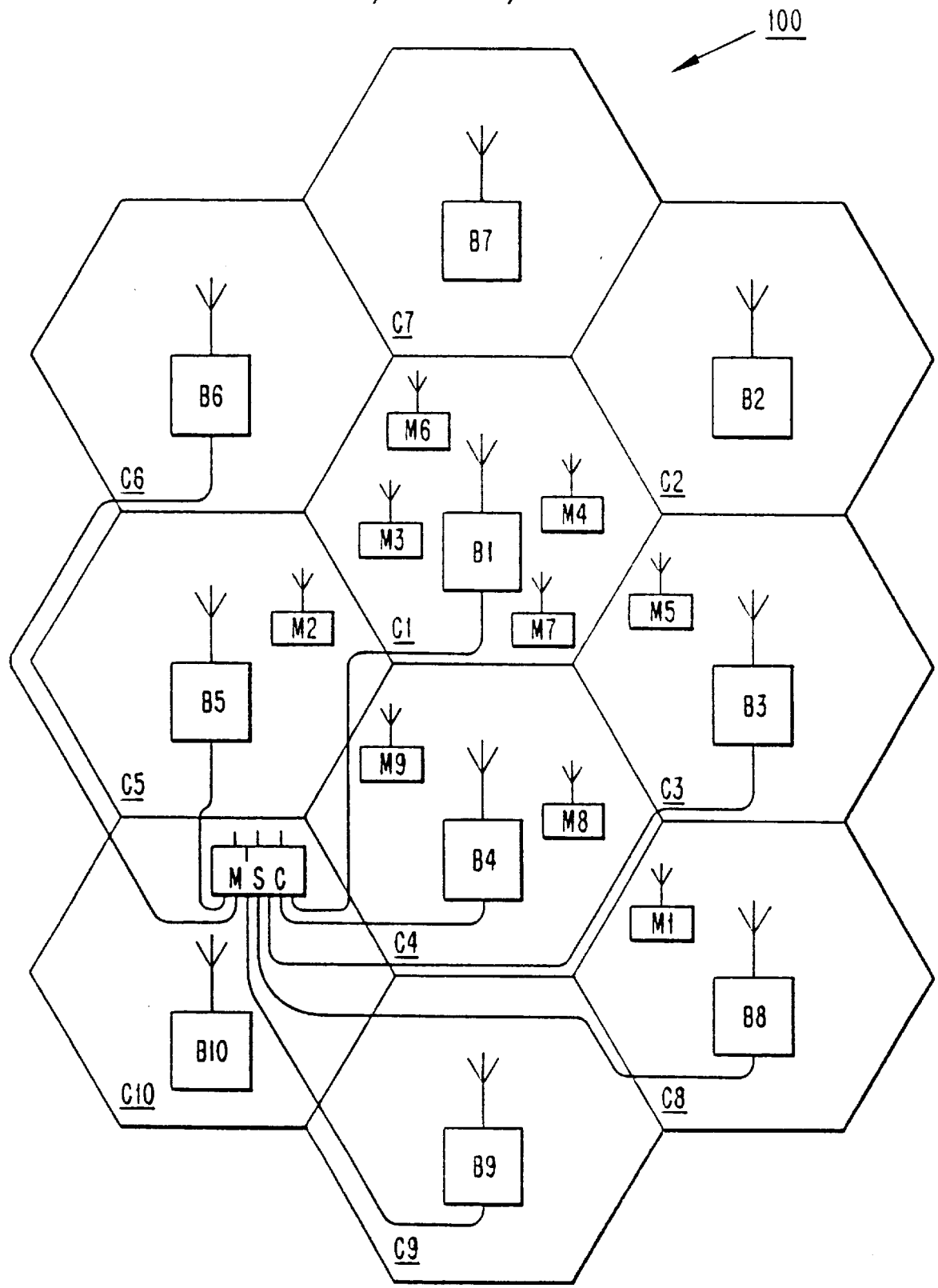
FIG. 1 is a schematic diagram illustrating ten cells in a cellular mobile radio telephone system to which the present invention applies.

The various features of the invention will now be described with respect to the figures, in which like parts are identified with the same reference characters.

FIG. 1 is a schematic diagram illustrating ten cells, C1 to C10, in a cellular mobile radio telephone system 100. The cellular mobile radio telephone system 100 may be, for example, a D-AMPS system. Normally the method according to the present invention would be implemented in a cellular system comprising many more cells than ten. For purposes of this description, the system depicted herein is considered to be an isolated portion of a larger system which has been fragmented.

For each cell C1 to C10, there is a respective base station B1 to B10. FIG. 1 illustrates base stations situated in the vicinity of the respective cell centers and having omni-directional antennas. The base stations of adjacent cells may however be located in the vicinity of cell borders and have directional antennas.

FIG. 1 also illustrates ten mobile stations M1 to M10, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 1 is a mobile switching center (MSC). The mobile switching center is connected to all ten illustrated base stations by cables. The mobile switching center is also connected by cables to a fixed public switching telephone network PSTN or similar fixed network with ISDN facilities. All cables from the mobile switching center to base stations and cables to the fixed network are not illustrated. Further, other media may be used instead of cables for base to mobile switching center communications, such as fixed radio links.

The cellular system 100 includes a plurality of radio channels for communication. The illustrated system is designed both for analog information, e.g., speech, digitized analog information, e.g., digitized speech, and pure digital information, e.g., pure digital data. In the context of the present invention, the term connection is used for a communication channel between a mobile station and another mobile station in the same system or another system, between two fixed telephones or terminals in a fixed network connected through the cellular system 100, or between a mobile station and a fixed telephone. A connection may be a call where two people talk to each other, but may also be a data communication channel where computers exchange data.

Each cellular system 100 is assigned a particular frequency band over which it can operate. A set of communication channels is allocated to each cell. For example, between ten and thirty different voice channels and one control channel may be allocated to any given cell. One criterion for allocating channels in each cell is the avoidance of excessive co-channel interference.

Hardware embodiments of the above-described cellular system components are well known, and need not be described here in detail. For purposes of this description, it is sufficient to understand that each of the base stations B1 to B10 and each of the mobile stations M1 to M10 comprise respective antennas and other radio transceiver equipment to be able to communicate with one another by means of select ones of the communication channels. Each of the base stations B1 to B10 and mobile stations M1 to M10 may include a processor for controlling the operation thereof, and each may further comprise equipment for measuring the signal strength and the C/I of selected ones of the communication channels.

Referring now to FIG. 2, this is an illustration of how all of the channels in a cellular system 100 are organized in accordance with one embodiment of the invention. The channels are logically divided up (i.e., organized) into a number, N, of channel groups 201-1, . . . , 201-N. Each channel group 201-x ($1 \leq x \leq N$) has at least one probe channel 203-x that is capable of being measured for interference in both the uplink and downlink directions.

A channel group 201-x may have more than one probe channel 203-x, but for purposes of illustration, only one is shown in each channel group 201-x in FIG. 2.

Techniques for making both uplink and downlink interference measurements are well known in the art, and are not described here in great detail. Essentially, for a probe channel 203-x that is not in use by the measuring cell, what is measured is signal strength of the channel. This signal strength measurement may be used directly as a measure of interference, because it is this signal energy that would interfere with the cell's own use of the channel. Although, strictly speaking, a cell does not actually experience interference if the channel is not actively used in the cell, the measured level of "expected interference" will henceforth be referred to simply as "interference" in this description.

A technique for measuring interference on an unused channel has just been described. If, however, the probe channel 203-x is in use by the measuring cell, then the level of interference cannot be measured directly. Instead, a C/I measurement is made, using known techniques. Since the measuring cell also knows the strength of the carrier signal (C) that it is using, it is a simple matter to determine the level of interference (I) that caused the measured C/I value.

Each channel group 201-x has, in addition to the probe channel 203-x, a number, $M_x$, of unmeasured channels 205-x-y ($1 \leq y \leq M_x$). The number $M_x$ of unmeasured channels 205-x-y in any channel group 201-x need not be constant, but can vary from group to group, and can even be zero. It is desirable to be able to assign channel groups 201-x to cells in such a way that the number of available channels (i.e., the number, $M_x$, of unmeasured channels plus the number of probe channels) is equal to the number of transceivers in that cell's base station. This is because if the number of transceivers is lower than the number of available channels, a number of channels will never be used, which is a waste of system resources. Therefore, it may be appropriate to define the number $M_x$ of channels within each channel group 201-x to be a small number in order to achieve a better "granularity". Alternatively, some larger channel groups might be created and assigned to cells more permanently, maybe months or years, until the growth of traffic causes cell splits or other configuration changes and to have smaller channel groups which are assigned to cells more temporarily to account for short term fluctuations in traffic.

In accordance with this embodiment of the invention, the measurement resources of the cellular system 100 are concentrated on the probe channels 203-1, . . . , 203-N, and these are measured regularly. The remaining channels in the system 100 are the unmeasured channels 205-1-1, 205-N-$M_N$, which, as the name implies, are not to be measured.

Each channel that cannot be measured in both the uplink and downlink directions, such as AMPS (analog) or broadcast channels, should be treated as one of the unmeasured channels 205-x-y in accordance with this embodiment of the present invention.

A strategy for allocating channels to cells in the cellular system 100 will now be described with reference to the flowchart of FIG. 3. In practice, these steps are preferably carried out by well-known measurement equipment located in the mobile stations (for downlink) and in the base stations (for uplink), and by processing means, such as a general purpose digital computer, coupled to receive the measurements and programmed to perform the following steps.

In step 301, for each of the cells C1 to C10, both uplink and downlink interference measurements are made on each of the probe channels 203-1, . . . , 203-N. Because the number of probe channels 203-1, . . . , 203-N is preferably relatively small when compared to the total number of channels (i.e., number of probe channels plus number of unmeasured channels), there is no difficulty in making all of these measurements. Also as explained earlier, interference on unused ones of the probe channels 203-1, . . . , 203-N is preferably determined simply by measuring the signal strength on these channels. For those ones of the probe channels 203-1, . . . , 203-N that are in use by the cell, interference is preferably computed from measurements of C/I, coupled with knowledge of the cell's own carrier signal strength.

Next, in step 303, the uplink and downlink interference measurements that were made on the probe channels 203-1, . . . , 203-N are supplied to an ACA algorithm that, in conventional systems, determines the allocation of just those probe channels 203-1, . . . , 203-N. One such ACA algorithm might, for example, take the form of, for each cell, determining which probe channel has the smallest amount of detected interference, and then allocating that probe channel to the cell. Other algorithms are also well known, such as those referred to in the BACKGROUND section of this description, and may be applied in the present invention. As the particular choice of ACA algorithm is not critical to the operation of the present invention, this aspect is not described here in further detail.

In accordance with the present invention, after the selected ACA strategy is applied to determine the allocation of the probe channels 203-1, . . . , 203-N, each allocation decision concerning a respective one of the probe channels 203-x is also applied to all of the unmeasured channels 205-x-1, . . . , 205-x-$M_x$, so that each probe channel's entire channel group 201-x is allocated. As illustrated in FIG. 3, the inventive ACA algorithm repeats steps 301 and 303 so that allocations of the channel groups 201-1, . . . , 201-N are not static, but instead change over time in order to make accommodations for changing system conditions.

Figure 3:
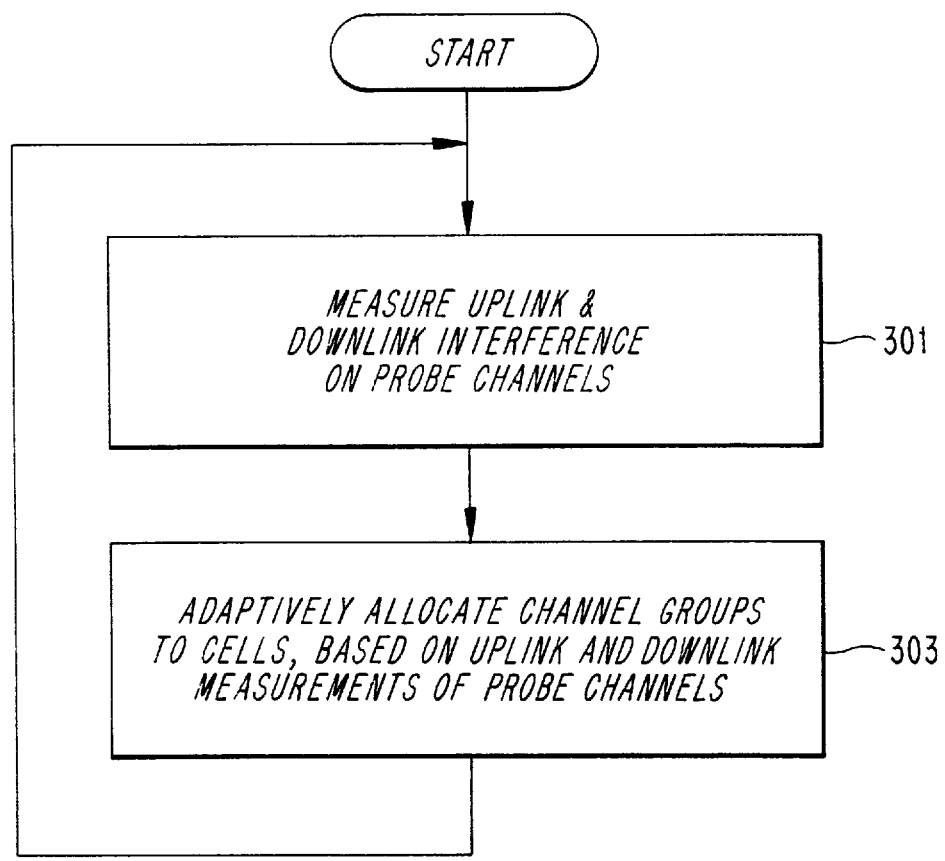
FIG. 3 is a flowchart depicting a strategy for allocating channels to cells in the cellular system in accordance with one embodiment of the invention.

By having each cell perform the steps illustrated in FIG. 3, the channel allocation strategy can be effected in a completely decentralized manner. However, it is not a requirement that each cell perform the steps illustrated in FIG. 3. In alternative embodiments of the invention, information about interference that is detected at each of the cells may be transmitted to several (partly decentralized) or even just one (completely centralized) node that contains the necessary equipment for making channel allocation decisions in accordance with the steps illustrated in FIG. 3.

The theory behind the above-described strategy is as follows. If a cell observes low interference on any particular probe channel 203-x over a long period of time (e.g., over a period of time that may span hours or even days), it assumes that none of the channels in the associated channel group 201-x are in use by any nearby cells, and that it can allocate the entire channel group 201-x to itself. In this way, a number of channel groups 203-x can be allocated to each cell in the cellular system 100, guided by the measurements of the probe channel 203-x in each group.

In a preferred embodiment of the invention, each cell gives the probe channel 203-x priority over the unmeasured channels 205-x-y when it comes to assigning a channel for use on a call. This increases the likelihood (but does not guarantee) that the probe channel 203-x will be in use, which in turn increases the likelihood that neighboring cells will detect this use and, in response, avoid allocating the associated channel group 201-x to themselves. This probe channel priority is not a requirement of the invention, however.

An alternative approach is to ensure that the probe channel 203-x is always active, even if there is no traffic on it. This guarantees that neighboring cells will avoid use of an already-allocated channel group, but has the drawback of unnecessarily utilizing part of the radio spectrum.

It is recognized that, on occasion, two cells that are relatively close to one another may each select the same channel group 201-x. In such instances, the resulting channel interference may be solved by, for example, subsequent handoff of the competing connections.

The inventive ACA scheme makes ACA more feasible in analog systems. It is also a solution for providing ACA on broadcast channels if digital channels are present that can be measured in both uplinks and downlinks, such as in AMPS/D-AMPS, GSM, and PDC. For example, consider an AMPS/D-AMPS system having 40 D-AMPS (digital) carriers and 200 analog AMPS carriers, making a total of 240 carriers. In accordance with the invention, the 240 carriers are divided up into 40 channel groups 201-1, . . . , 201-40, each channel group 201-x ($1 \leq x \leq 40$) comprising 1 D-AMPS carrier and 5 AMPS carriers.

It is possible to measure signal strengths and bit error rates in both the uplink and downlink directions on the D-AMPS carriers, making it therefore feasible to apply a "slow" ACA strategy on them. This means that each base station will allocate one or more D-AMPS carriers based on long term measurements of interference in both up- and downlinks.

However, for each D-AMPS carrier that is allocated to a base station in a cell, the 5 associated AMPS carriers are also allocated. When connecting a call to a base station, one of the channels on the carriers allocated to this base station is chosen. Selection of an allocated channel for use on a call may be based on factors such as whether the call is associated with an AMPS or a D-AMPS mobile, and whether a priority scheme, as described above, has been adopted in the base station.

It can be seen from this example that the AMPS system will be adaptive, based on the adaptive plan of the D-AMPS system, although there are no measurements performed on the AMPS carriers. Allocation decisions made in this manner with respect to AMPS channels yield improvements in system performance because system utilization changes that require an adaptation of the allocation of unmeasured channels 205-x-y are mirrored in the utilization changes of the measurable probe channels 203-x.

Figure 4:
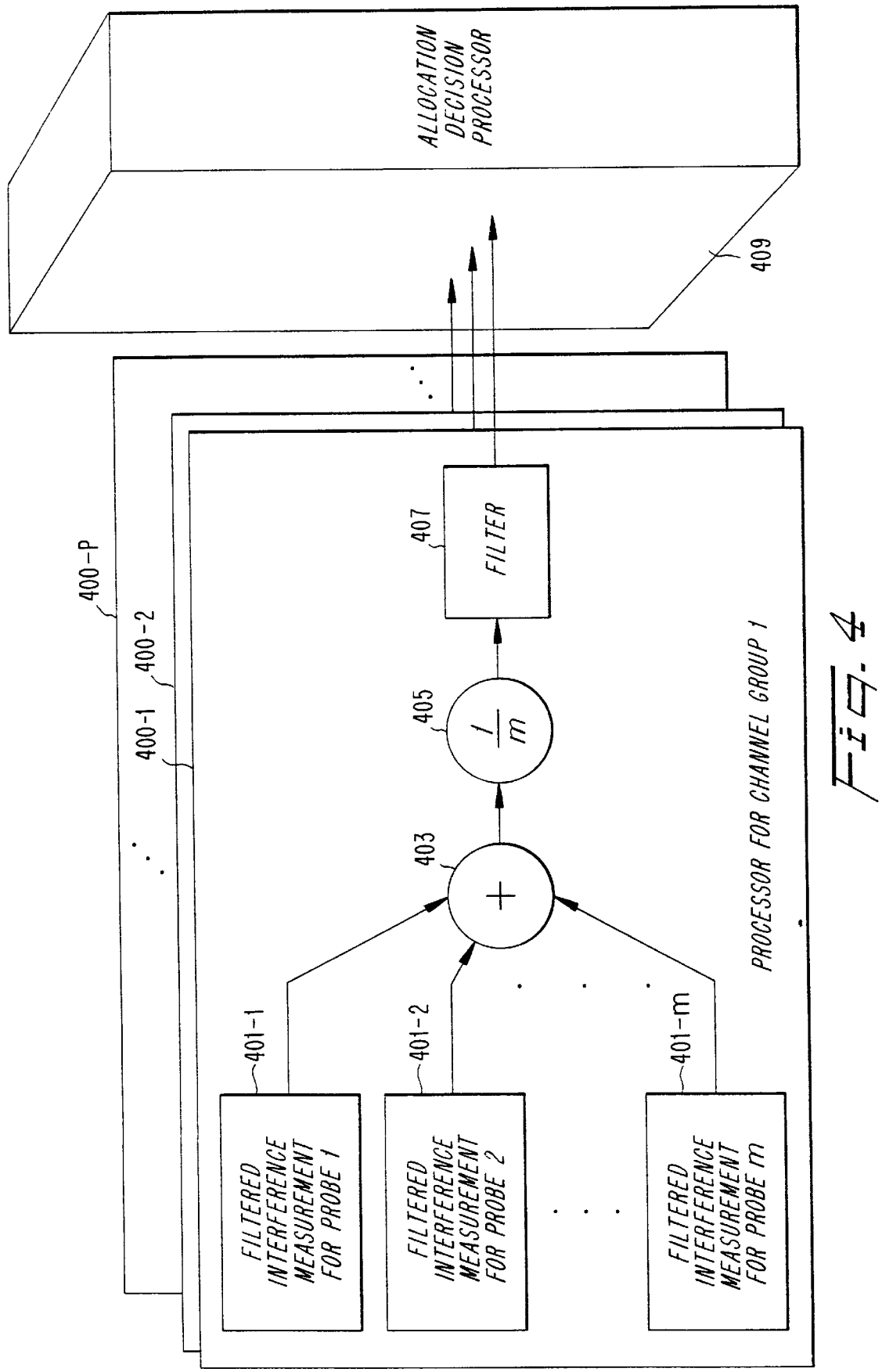
FIG. 4 is a high level block diagram of processing equipment for carrying out the invention.
Figure 5:
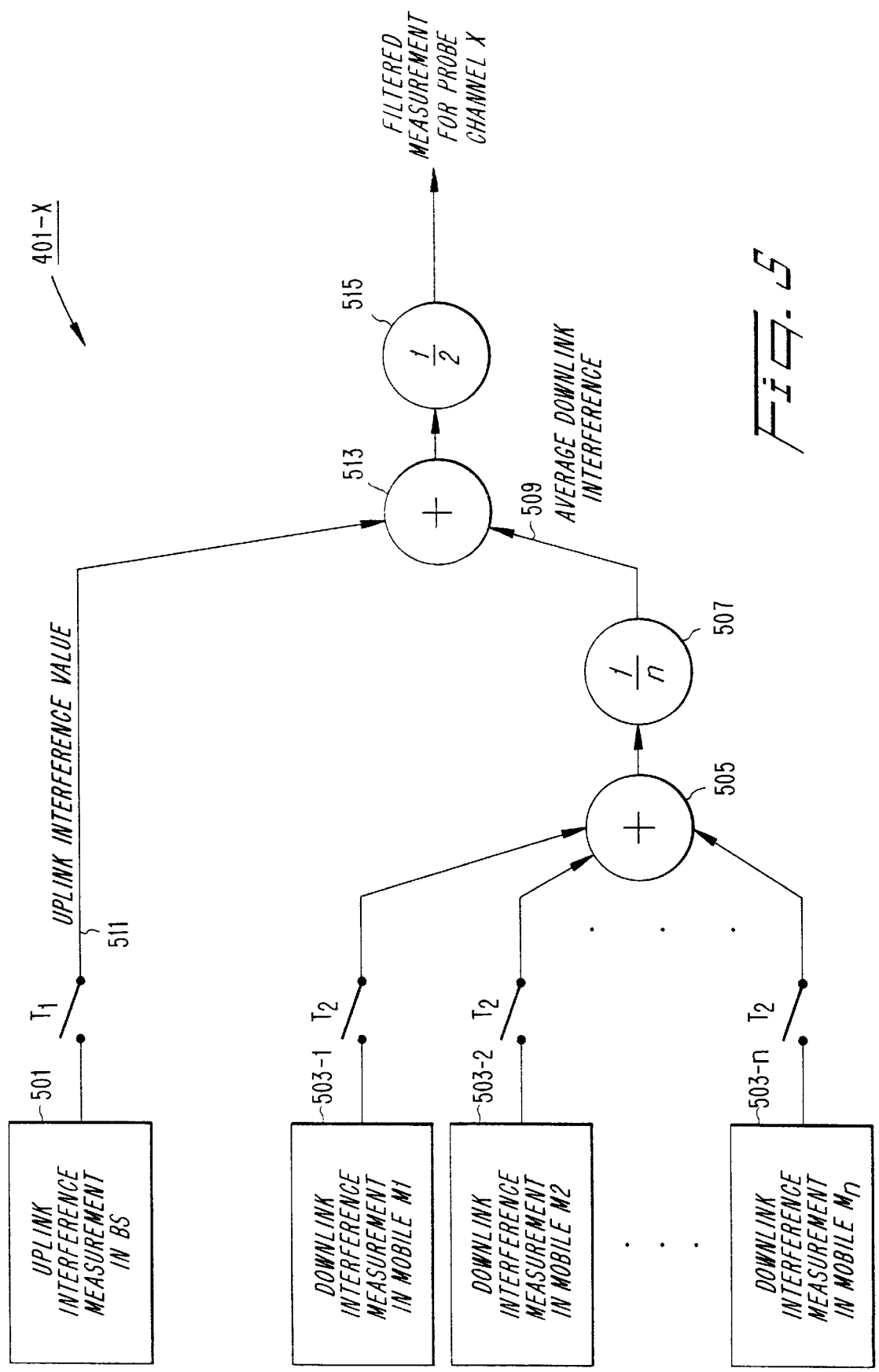
FIG. 5 is a block diagram of an apparatus for producing a filtered probe channel interference measurement in accordance with one aspect of the invention.
Figure 6:
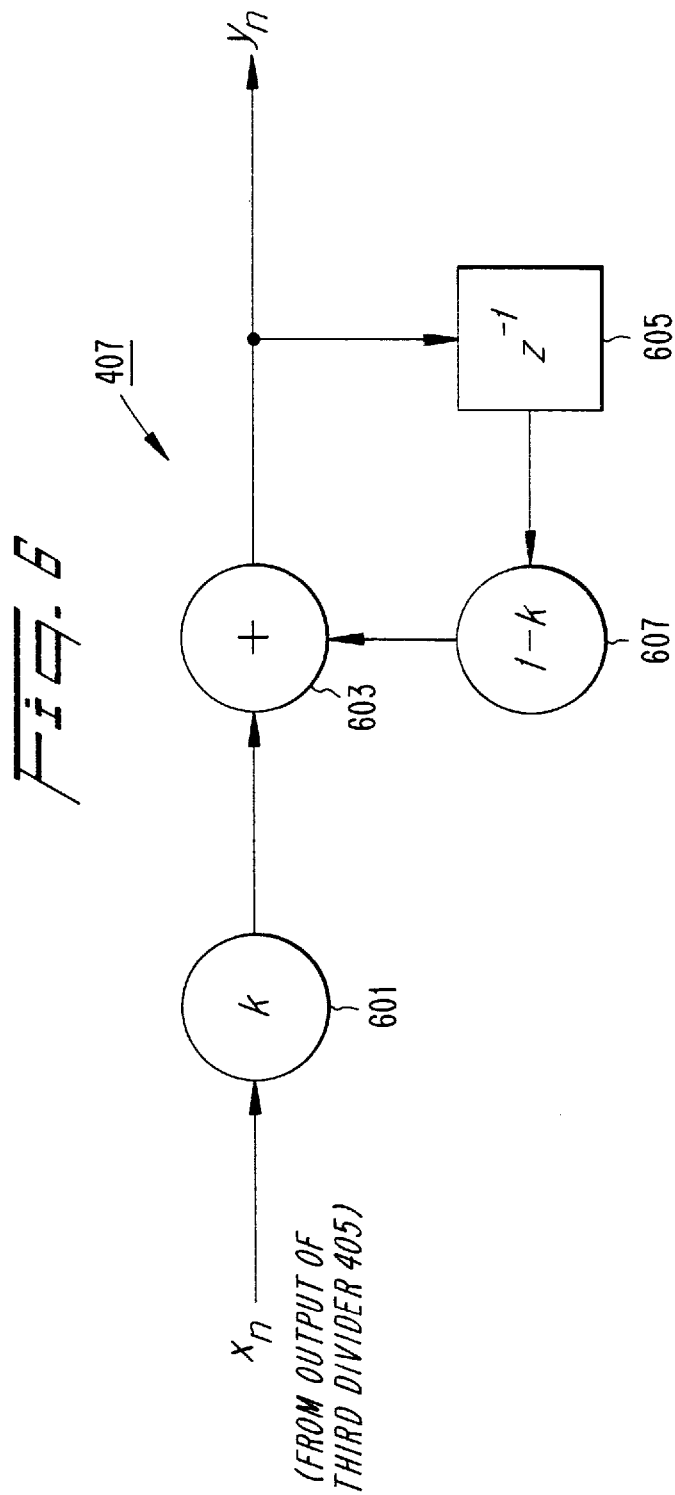
FIG. 6 is a schematic diagram of a one pole filter for use with the present invention.

A preferred embodiment of an apparatus for carrying out the steps of FIG. 3 will now be described with respect to FIGS. 4–6. Referring first to FIG. 4, a high level block diagram of the necessary processing equipment for carrying out the whole of the inventive procedure is shown. In this illustrated embodiment, a system is presumed to have defined therein a number, P, of channel groups 201-1, . . . , 201-P. The elements for performing the processing associated with each of these channel groups 201-1, . . . , 201-P is identical, so the following description is limited to a discussion of the hardware 400-1 associated with the first one of the channel groups 201-1. It should be understood, however, that this description is equally applicable to any of the channel groups.

As mentioned earlier, each of the channel groups 201-1, . . . , 201-P must include at least one probe channel, but it may include more than one. It will therefore be assumed that the first channel group 201-1 includes an arbitrary number, m, of probe channels 203-1, . . . , 203-m, where m≧1. For each of the probe channels 203-1, 203-m there are corresponding filtered interference measurement units 401-1, . . . , 401-m in place for generating a filtered interference measurement. A more detailed description of an arbitrary one, x, of these identical filtered interference measurement units 401-1, . . . , 401-m will now be presented with reference to FIG. 5.

At each time interval T1, an uplink interference measurement unit 501 determines uplink interference on the probe channel 203-x in accordance with known techniques as described above. In accordance with a preferred embodiment of the invention, downlink interference on the probe channel 203-x is taken to be the average of the downlink interference levels as measured by a number, n, of mobiles M1, . . . , Mn that are currently operating within the cell, where preferably n≧1. Accordingly, FIG. 5 shows n downlink interference measurement units 503-1, . . . , 503-n which determine downlink interference on the probe channel 203-x as experienced by a corresponding one of the mobiles M1, . . . , Mn. Each of these measurements is made in accordance with known techniques as described above.

The downlink interference measurements are made once every time interval T2, and summed in a first summing unit 505. The output of the first summing unit 505 is provided to a first dividing unit 507 that divides the sum by the number n in order to obtain the average measured downlink interference value.

The output of the filtered interference measurement unit 401-x is taken to be the average of the uplink interference value 511 and the average downlink interference value 509. This is produced by providing each of the uplink interference value 511 and the average downlink interference value 509 to respective inputs of a second summing unit 513, and supplying this to a second dividing unit 515 that divides by 2.

Returning now to FIG. 4, outputs from each of the filtered interference measurement units 401-1, . . . , 401-m are averaged by being supplied to respective inputs of a third summing unit 403, the output of which is supplied to a third divider 405 that divides by the number m.

The output of the third divider 405 is then supplied to a filter 407 which generates the value upon which an allocation decision processor 409 will operate. The operation of the filter 407 will now be described in greater detail with reference to FIG. 6.

In a preferred embodiment of the invention, the filter 407 is a one pole infinite impulse response (IIR) filter that generates a sequence of outputs from a sequence of inputs. The nth output, $y_n$, of the filter 407 is related to the nth input, $x_n$, by the following equation:

$$y_n = y_{n-1} + k \cdot (x_n - y_{n-1}),$$

where k is a constant, and $y_n$, $y_{n-1}$ and $x_n$ are all interference values expressed in Watts. The value of k is preferably $10^{-3}$ or smaller. The filter 407 illustrated in FIG. 6 generates the desired output as follows. The input $x_n$ is supplied by the output of the third divider 405 to a first scaling unit 601 that generates an output that is k times the input value. The output of the first scaling unit 601 is supplied to a first input of a fourth summing unit 603. A second input of the fourth summing unit 603 receives a signal that is (1–k) times the previous output value, $y_{n-1}$, and which is generated by the delay unit 605 and second scaling unit 607 as shown. Those having ordinary skill in the art will recognize that the filter 407 operates as a low pass filter, whose time constant is determined by the value of k.

Returning now to FIG. 4, the allocation decision processor 409 receives outputs from each of the filters 407 associated with each of the channel groups. The allocation decision processor 409 performs step 302 that was described above with reference to FIG. 3. As indicated earlier, the steps involved in deciding which of the channel groups 201-1, . . . , 201-P to allocate to the cell will depend upon the particular ACA strategy that is selected. The strategy may be to select that one of the channel groups 201-1, 201-P that has the lowest filtered interference value (from the filter 407). Alternatively, the strategy may be simply to allocate that one of the channel groups 201-1, . . . , 201-P whose filtered interference value is an acceptably low value, even if it is not the lowest compared with other channel groups.

In another aspect of the invention, it is possible to define two different types of channel groups 201-x according to the reuse partitioning principle. A first type of channel group 201-x comprises groups of channels which typically are used at a small distance around base stations and which require only a low transmission level resulting in extra low disturbance and a short reuse distance for the same radio channel. A second type of channel group 201-x comprises groups of channels which typically occupy the periphery of larger cells around base stations and which require a high transmission level resulting in considerable disturbance and a relatively long reuse distance for the same radio channel.

An alternative embodiment of the invention, which is particularly advantageous where downlink interference measurement resources are scarce (e.g., GSM) or nonexistent (e.g., AMPS and TACS), will now be described with respect to FIG. 7. In this embodiment, interference measurements are performed on all of the channels in the system 100, not just a select number of probe channels. The channels are divided up into a number, N, of channel groups 701-1, . . . , 701-N. Each channel group 701-x (1≦x≦N) comprises a number $M_x$ of channels 703-x-y (1≦y≦$M_x$), where the number $M_x$ of channels in any given channel group 701-x need not be uniform from group to group. In accordance with this alternative ACA strategy, interference measurements are made on all of the channels. These measurements may be made in both the uplink and downlink directions, if possible, or may only comprise uplink interference measurements, as in the case of analog systems. Then, for each channel group 701-x, the measurements for the constituent channels 703-x-1, 703-x-$M_x$ are combined to form a measurement value representative of the group as a whole. For example, the interference measurements may be averaged on a per-group basis. The method and apparatus described above with respect to FIGS. 4–6 may be used to implement this embodiment of the invention as well. Then, the set of average measurements are applied as inputs to an ACA scheme which, for example, might comprise allocating to a cell that one of the channel groups 701-x having the lowest average interference value.

This strategy is advantageous, where feasible (i.e., where measurements can be made on all channels in the system 100), because the total number of measurements per time unit on a group is much higher than the number of measurements per individual channel. This results in better channel reallocation decisions; instead of reallocating a channel whose infrequent utilization can be mistaken for non-use by nearby cells, a channel group 701-x is reallocated on the basis of combined measurements of all of the channels in the group. This embodiment of the invention is particularly well-suited for use in systems where downlink measurement resources are scarce or non-existent because, by basing an allocation decision on a combined uplink measurement instead of on uplink measurements for individual channels, it is statistically more likely that the decision will be based on an accurate assessment of whether the channels in question are already in use in a nearby cell. That is, if one were to measure uplink interference on only one channel, a low interference value would not necessarily mean that the neighboring cell was not using this channel. Thus, the channel could not be allocated to a present cell with the confidence that this would not cause interference. However, if it is determined that low uplink interference levels are detected on most, or all, channels belonging to a particular channel group 701-x, then it is very likely that this is because the neighboring cells have not allocated this channel group 701-x for their own use. Consequently, the present cell can make a reasonable decision to allocate the channel group 701-x for its own use.

The above-described embodiments of the invention improve ACA performance for both digital and analog systems. This method can also be applied to adaptive planning of broadcast channels by including a broadcast channel as an unmeasured channel 205-x-y in a channel group 201-x.

By dividing the channels into the N channel groups 201-1, ..., 201-N, the dimensions of the channel allocation problem are reduced. Instead of monitoring all channels and treating them individually, only a fraction of the channels are monitored.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a cellular communication system comprising a plurality of cells and a plurality of channels, the plurality of channels comprising a plurality of probe channels for which interference can be measured in both uplink and downlink directions and a plurality of unmeasured channels for which interference measurements are not made in both uplink and downlink directions, a method of allocating the plurality of channels, comprising the steps of:

organizing the plurality of channels into a plurality of channel groups, wherein each channel group comprises at least one probe channel, and wherein at least one of the channel groups further comprises at least one unmeasured channel; and for each one of the cells, performing an allocation routine comprising the steps of:

monitoring at least one of the channel groups by making and collecting uplink and downlink interference measurements on said at least one probe channel of said at least one of the channel groups over a predetermined time period;

analyzing the collected uplink and downlink interference measurements; and allocating a selected one of the monitored channel groups to said one cell in dependence on the analyzed uplink and downlink interference measurements.

2. The method of claim 1, wherein for each one of the cells, the allocation routine is performed in said one of the cells.

3. The method of claim 1, wherein the selected one of the monitored channel groups is one of the channel groups that further comprises at least one unmeasured channel, whereby said at least one unmeasured channel is allocated to said one cell whenever the selected one of the monitored channel groups is allocated to said one cell.

4. The method of claim 1, wherein the plurality of unmeasured channels includes a channel for use in an analog cellular communications system.

5. The method of claim 1, wherein:

the step of analyzing the collected uplink and downlink interference measurements comprises generating a filtered measurement from the collected uplink and downlink interference measurements; and the step of allocating the selected one of the monitored channel groups to said one cell in dependence on the analyzed uplink and downlink interference measurements comprises allocating the selected one of the monitored channel groups to said one cell in dependence on a comparison between the filtered measurement and a predefined threshold value.

6. In a cellular communication system comprising a plurality of cells and a plurality of channels, the plurality of channels comprising a plurality of probe channels for which interference can be measured in both uplink and downlink directions and a plurality of unmeasured channels for which interference measurements are not made in both uplink and downlink directions, a method of allocating the plurality of channels, comprising the steps of:

organizing the plurality of channels into a plurality of channel groups, wherein each channel group comprises at least one probe channel, and wherein at least one of the channel groups further comprises at least one unmeasured channel; and for each one of the cells, performing an allocation routine comprising the steps of:

monitoring at least two of the channel groups by making and collecting uplink and downlink interference measurements on said at least one probe channel of each of said at least two of the channel groups over a predetermined time period;

analyzing the collected uplink and downlink interference measurements by generating, for each one of said at least two of the channel groups, a filtered measurement from the uplink and downlink interference measurements collected for said each one of said at least two of the channel groups; and allocating a selected one of the monitored channel groups to said one cell in dependence on a comparison to one another of the filtered measurements of each one of said at least two of the channel groups.

7. In a cellular communication system comprising a plurality of cells and a plurality of measurable channels for which interference can be measured in at least one of uplink and downlink directions, a method of allocating the plurality of measurable channels, comprising the steps of:

organizing the plurality of channels into a plurality of channel groups, wherein each channel group comprises at least one measurable channel, and wherein at least one of the channel groups comprises at least two measurable channels, wherein each channel group further comprises at least one unmeasured channel; and for each one of the cells, performing an allocation routine comprising the steps of:

monitoring at least one of the channel groups by making and collecting interference measurements on each one of said at least one measurable channel of said at least one of the channel groups over a predetermined time period;

analyzing the collected interference measurements; and allocating a selected one of the monitored channel groups to said one cell in dependence on the analyzed interference measurements.

8. The method of claim 7, wherein each of the measurable channels is a channel for which interference can be measured in both the uplink and downlink directions.

9. The method of claim 7, wherein the step of analyzing the collected interference measurements comprises, for each of the at least one of the channel groups, generating an average interference measurement from the collected interference measurements.

10. In a cellular communication system comprising a plurality of cells and a plurality of channels, the plurality of channels comprising a plurality of probe channels for which interference can be measured in both uplink and downlink directions and a plurality of unmeasured channels for which interference measurements are not made in both uplink and downlink directions, an apparatus for allocating the plurality of channels, comprising:

means for organizing the plurality of channels into a plurality of channel groups, wherein each channel group comprises at least one probe channel, and wherein at least one of the channel groups further comprises at least one unmeasured channel; and for each one of the cells, means for performing an allocation routine comprising:

means for monitoring at least one of the channel groups by making and collecting uplink and downlink interference measurements on said at least one probe channel of said at least one of the channel groups over a predetermined time period;

means for analyzing the collected uplink and downlink interference measurements; and means for allocating a selected one of the monitored channel groups to said one cell in dependence on the analyzed uplink and downlink interference measurements.

11. The apparatus of claim 10, wherein for each one of the cells, the means for performing the allocation routine is located in said one of the cells.

12. The apparatus of claim 10, wherein the selected one of the monitored channel groups is one of the channel groups that further comprises at least one unmeasured channel, whereby said at least one unmeasured channel is allocated to said one cell whenever the selected one of the monitored channel groups is allocated to said one cell.

13. The apparatus of claim 10, wherein the plurality of unmeasured channels includes a channel for use in an analog cellular communications system.

14. The apparatus of claim 10, wherein:

the means for analyzing the collected uplink and downlink interference measurements comprises means for generating a filtered measurement from the collected uplink and downlink interference measurements; and the means for allocating the selected one of the monitored channel groups to said one cell in dependence on the analyzed uplink and downlink interference measurements comprises means for allocating the selected one of the monitored channel groups to said one cell in dependence on a comparison between the filtered measurement and a predefined threshold value.

15. In a cellular communication system comprising a plurality of cells and a plurality of channels, the plurality of channels comprising a plurality of probe channels for which interference can be measured in both uplink and downlink directions and a plurality of unmeasured channels for which interference measurements are not made in both uplink and downlink directions, an apparatus for allocating the plurality of channels, comprising:

means for organizing the plurality of channels into a plurality of channel groups, wherein each channel group comprises at least one probe channel, and wherein at least one of the channel groups further comprises at least one unmeasured channel; and for each one of the cells, means for performing an allocation routine comprising:

means for monitoring at least two of the channel groups by making and collecting uplink and downlink interference measurements on said at least one probe channel of each of said at least two of the channel groups over a predetermined time period;

means for analyzing the collected uplink and downlink interference measurements by generating, for each one of said at least two of the channel groups, a filtered measurement from the uplink and downlink interference measurements collected for said each one of said at least two of the channel groups; and means for allocating a selected one of the monitored channel groups to said one cell in dependence on a comparison to one another of the filtered measurements of each one of said at least two of the channel groups.

16. In a cellular communication system comprising a plurality of cells and a plurality of measurable channels, wherein each channel group further comprises at least one unmeasured channel for which interference can be measured in at least one of uplink and downlink directions, an apparatus for allocating the plurality of measurable channels, comprising:

means for organizing the plurality of channels into a plurality of channel groups, wherein each channel group comprises at least one measurable channel, and wherein at least one of the channel groups comprises at least two measurable channels; and for each one of the cells, means for performing an allocation routine comprising:

means for monitoring at least one of the channel groups by making and collecting interference measurements on each one of said at least one measurable channel of said at least one of the channel groups over a predetermined time period;

means for analyzing the collected interference measurements; and means for allocating a selected one of the monitored channel groups to said one cell in dependence on the analyzed interference measurements.

17. The apparatus of claim 16, wherein each of the measurable channels is a channel for which interference can be measured in both the uplink and downlink directions.

18. The apparatus of claim 16, wherein the means for analyzing the collected interference measurements comprises means for generating, for each of the at least one of the channel groups, an average interference measurement from the collected interference measurements.

* * * * *